United States Patent [19]

Heggenstaller et al.

US005100601A

[11] Patent Number: 5,100,601

[45] Date of Patent: Mar. 31, 1992

[54] PROCESS FOR PRESSING A FLEXURALLY RIGID, BEAM-SHAPED MOLDING

[75] Inventors: Anton Heggenstaller; Xaver Spies, both of Unterbernbach, Fed. Rep. of Germany

[73] Assignee: Anton Heggenstaller GmbH, Unterbernbach, Fed. Rep. of Germany

[21] Appl. No.: 526,296

[22] Filed: May 21, 1990

[30] Foreign Application Priority Data

May 23, 1989 [DE] Fed. Rep. of Germany ....... 3916774

[51] Int. Cl.[5] .............................................. B29C 43/14

[52] U.S. Cl. .................................... 264/113; 264/119; 264/120

[58] Field of Search ............... 264/113, 120, 119, 294, 264/325

[56] References Cited

U.S. PATENT DOCUMENTS

| | | | |
|---|---|---|---|
| 2,888,715 | 6/1959 | Frank | 264/120 |
| 3,166,617 | 1/1965 | Munk | 264/109 |
| 3,809,736 | 5/1974 | Munk | 264/120 |
| 3,933,968 | 1/1976 | Sorbier | 264/297 |
| 3,997,643 | 12/1976 | Munk et al. | 264/120 |
| 4,536,366 | 8/1985 | Inoue | 419/11 |
| 4,559,194 | 12/1985 | Hegenstaller | 264/113 |
| 4,559,195 | 12/1985 | Heggenstaller | 264/120 |
| 4,645,631 | 2/1987 | Hegenstaller et al. | 264/69 |
| 4,649,006 | 3/1987 | Heggenstaller | 264/120 |
| 4,960,553 | 10/1990 | DeBruine et al. | 264/113 |

FOREIGN PATENT DOCUMENTS

| | | | |
|---|---|---|---|
| 0065660 | 12/1982 | European Pat. Off. . | |
| 1234381 | 9/1967 | Fed. Rep. of Germany . | |
| 1361854 | 4/1964 | France | 264/120 |

*Primary Examiner*—Mary Lynn Theisen

*Attorney, Agent, or Firm*—McGlew & Tuttle

[57] ABSTRACT

The present invention pertains to a process and devices for producing beam-shaped moldings from fine plant parts mixed with binders in molding presses. Based on the discovery that the degree of compaction of the core of such moldings decreases with increasing cross section of the moldings, it is suggested in the present invention that the core zone of the molding be formed by an additional amount of fine parts moved there and compacted deliberately, which amount of material acts reactively as a compression zone to the moveable walls surrounding it during the compaction of the molding. Compaction of the molding over its entire cross section and at the same time particularly great compaction of the peripheral zones of the molding are thus achieved. The strength and the bending resistance of such moldings are particularly high, and such moldings are therefore also suitable for forming railroad ties.

16 Claims, 6 Drawing Sheets

PROCESS FOR PRESSING A FLEXURALLY RIGID, BEAM-SHAPED MOLDING

FIELD AND BACKGROUND OF THE INVENTION

The present invention relates in general to pressing molds and in particular to a new and useful method and device for compacting bulk material into railroad ties. Fine plant parts are mixed with binders in a molding press, in which moveable wall pairs that can be moved against each other form between them the filling and pressing chamber. Pressing strokes are performed alternatingly and repeatedly after which the pressed molding is cured under the effect of heat while maintaining the pressure. Such a process is known from West German Patent No. 32,27,074. In the procedure described the moveable walls are located opposite each other and define the mold chamber. The moveable walls act on the mixture entered into the mold chamber in pairs consecutively and repeatedly. This has proved successful especially in the production of I sections, whose webs and legs have approximately equal thickness.

However, if beam-shaped moldings of substantially greater cross section are to be pressed from the fine plant parts mixed with binder, as would be the case, e.g., when pressing railroad ties, the prior-art technique is not sufficient for bringing about the pressing of the fine parts over the entire cross section. Even if the outer surface of the molding to be formed is subjected to the repeated and intense action of the moveable wall pairs, the pressure that is reasonably available is not sufficient for pressing the fine parts present in the middle zone of the molding with the required intensity. What is found, instead, in this central zone of the molding is a loose structure of fine parts, which therefore fails to share the strength of the entire molding. There is even a risk of formation of shrinkage cavities or other cavities.

SUMMARY OF THE INVENTION

Therefore, the basic task of the present invention is to provide a process, and a device suitable for carrying out the process, which makes it possible to press fine plant parts intensively over the entire cross section of a large-sized, beam-shaped molding and to avoid the above-mentioned disadvantages.

West German Patent No. DE-PS 32,27,074, describes a device for compressing compactable material. According to the present invention in that at the beginning of the pressing operating strokes, an additional amount of fine parts is pressed into a designated section of the mold chamber. The designated section is a section of the molding subject to tensile stress. As a result of which a compression zone of particularly pre-compacted fine parts, which exerts a reactive effect against the subsequent pressing pressure of the moveable wall pairs, is created.

A core of pre-compacted fine plant parts is formed by this method within the mold chamber. This core exerts a reactive effect in relation to the subsequent pressing strokes acting from different directions. Every individual press stroke of the moveable walls leads to compression of the compacted mixture in this pre-compacted central core zone. As a result this core zone in turn undergoes additional compaction and its reactive effect is intensified. It is recognizable from the cross section of the finished pressed molding how the fine parts filled loosely into the filling chamber appear in the form of layers. The layers form wave-shaped, curved or even intermeshing layers, which surround the core of pre-compacted fine parts like flow lines. In addition, considerably more strongly compacted layers, are recognizable in the peripheral zones of the molding. This causes particularly high strength in the edge zone of the molding.

It is also possible to have two or more additional amounts, arranged in a distributed pattern, act on the mixture of fine parts according to the present invention.

The present invention made it possible, to compact a molding of large cross section over its entire cross section very strongly and inexpensively. Thus creating the prerequisite for using the molding under particularly high loads, as occur, e.g., in railroad ties. The present invention is not limited to this field of application, but comprises all the applications of the moldings according to the present invention in a great variety of technical areas.

In an embodiment of the present invention, the pre-compacted core is formed in a very simple manner by pressing the additional amount from a channel-shaped chamber, which expands and extends over the entire length of the chamber, into the mixture mentioned in the mold chamber. The channel-shaped chamber is preferably formed by at least one setback moveable wall of a moveable wall series. After the channel-shaped chamber has been filled the setback moveable wall is first moved alone, and then together with the series of moveable walls. It is also possible first to move the moveable wall series and then to close the channel-shaped chamber. In this case the two movements can also be performed simultaneously.

EP-A 0,065,660 describes railroad ties as being pressed from fine plant parts mixed with binders by specially compacting the zone on which the rails of the track will come to lie. In EP-A 0,065,660 either plate-shaped parts are set into the surface of the railroad tie areas on which the rails of the track come to lie, or a heap of fine parts, which was formed on said support surfaces of the rails, is pressed together with the mixture filled into the mold. As a result of which a strip-shaped superficial compaction takes place.

It may be true that this strip-shaped compaction of the support surface for the rail prevents pressure exerted by the engine and the railroad cars traveling on the rail from pressing the rail into the railroad tie. However, one has obviously overlooked the fact that the overall strength of the railroad tie thus produced is much too low. The reason being it is not possible to produce a molding with high strength and bending resistance from fine plant parts by pressing the mass of fine parts in a mold in one direction only.

The present invention differs from this, in principle, by the fact that the additional amount introduced into the core zone of the mold chamber is intended to offer an opposing force to the pressing forces acting from different directions. The fine parts located between the moveable walls and the pre-compacted zone are compressed, and as a result of which the above described flow line structure of layers is formed. It is thus possible to produce a molding of large cross section with particularly high strength.

It has proved particularly advantageous within the framework of the present invention to add a certain percentage of long chips to the mixture of fine parts to be pressed. Introducing them into the mold chamber such that the long chips will be oriented in parallel to the longitudinal direction of the moldings. The long chips are prepared for the pressing process according to the present invention in a suitable manner. Using long chips of a size of circa 150 mm in length, 5–8 mm in width, and 0.4–0.8 mm in thickness has proved to be advantageous, but the present invention is not limited to these dimensions, and they are intended only to indicate generally the dimensions which the long chips are to have.

It is known from West German Patent No. DE-PS 33,46,469 how "pin chips" (i.e., small-sized, long chips can be introduced into a mold chamber oriented in the longitudinal direction in order to subsequently perform pre- pressing and to subsequently extrude the pre-pressed object. Even though extrusion cannot be considered in the present invention, it is nevertheless possible to use the prior-art measures to orient the long chips. Therefore, to disclose the present invention, we expressly refer to the teaching of the prior known document.

In accordance with one aspect of the invention moldings of particularly large cross section are best obtained by performing a pre-pressing in a first press and the final pressing of the molding in a subsequent, second press. It is important for the molding formed in the first press to be pushed, together with molding plates, which act against the side walls of the molding, out of the first molding press and to be introduced into the second molding press.

It is known from West German Offenlegungsschrift No. DE-OS 33,07,557 that the finished pressed molding can be pushed, together with the molding plates surrounding it, out of the press and introduced, while maintaining the pressing pressure, into a setting zone, in which the mixture will set under the effect of heat. The teaching shown in this document for guiding the molding plates can be used without problems in the present invention, but the moveable walls remain in the molding press and the molding is pushed off only with the molding plates.

A further object of the invention is to provide a device for pressing flexurally rigid beam shaped moldings which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DESCRIPTION OF THE PREFERRED EMBODIMENT

Figure 1:
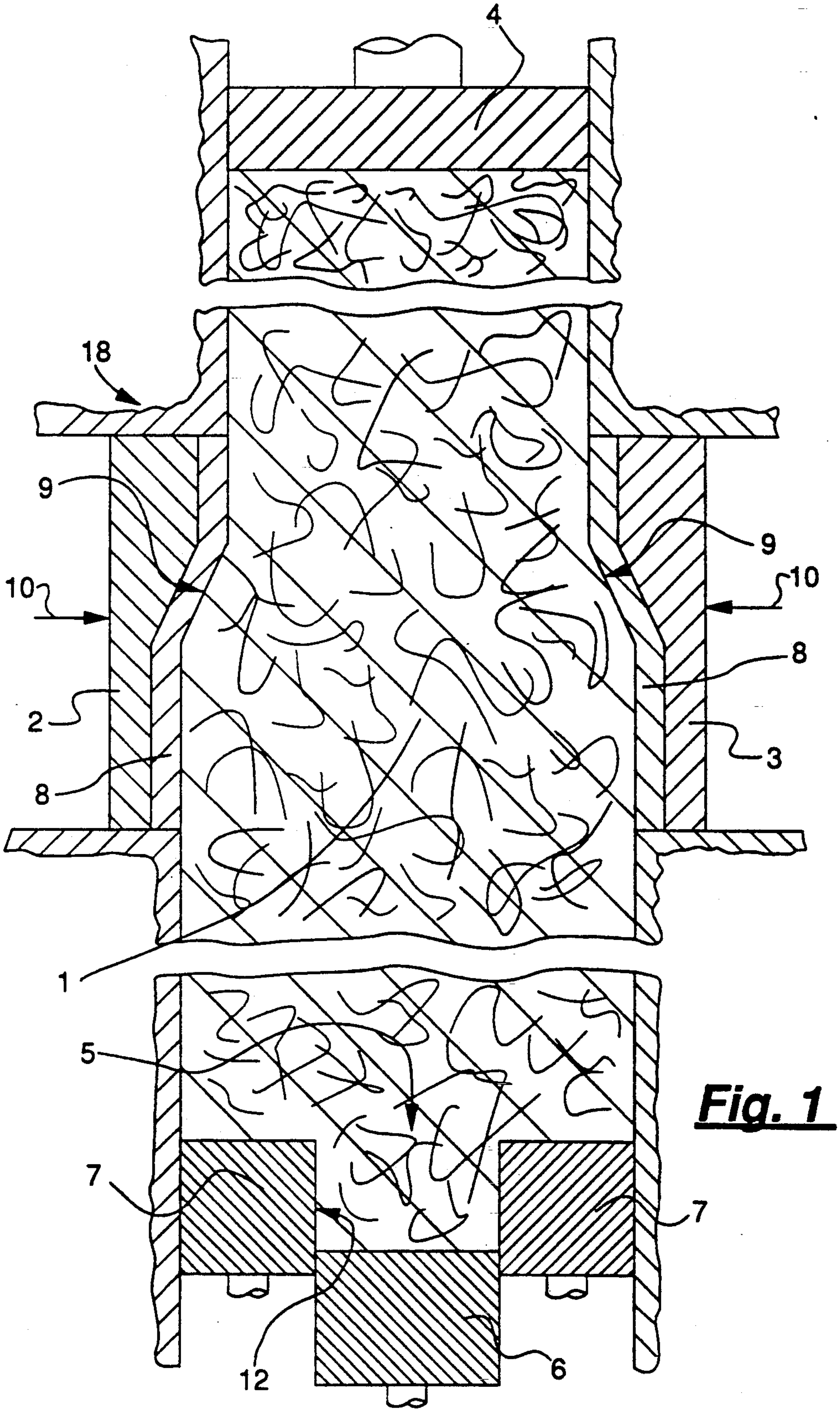
FIG. 1 is a cross section through a mold chamber after a lateral transverse pressing was performed.

The example according to FIG. 1 shows the cross section of a first molding press in which a molding chamber 1 is filled with a mixture of plant parts and binders. Depending on the intended use, wood chips or particles of other plant fibers, e.g., straw and the like, can be used as particles. If moldings of particularly high strength and large cross section, e.g., railroad ties, are to be produced, it is recommended that long chips be used, which are introduced into the molding chamber 1 in an oriented position. It should be borne in mind in this connection that the long chips extend in the longitudinal direction of the molding.

Said molding chamber 1 is defined by the moveable walls 2, 3, 4, and 5. The lateral moveable walls 2 and 3 and the moveable walls 4 and 5 which are movable in the vertical direction form moveable wall pairs whose movement is controlled such that the moveable wall pairs act on the material filled into the molding chamber 1 one after another and repeatedly, as will be described later.

In the embodiment described, said lower moveable wall 5 consists of a series of individual moveable walls 6 and 7 arranged next to each other, the middle one 6 of which is set back and therefore forms a channel-shaped chamber 12 which expands said molding chamber 1 in the area where the material consisting of fine parts intended for forming the zone subject to tensile stress of the molding is located. The example in FIG. 2 shows the contour of a beam cross section in which the zone subject to tensile stress is located in the lower zone of said molding chamber 1.

It is assumed in FIG. 1 that said molding chamber 1 is filled in a suitable manner, and said upper moveable wall 4 can be assumed to be removed during the filling process. After completion of the filling process, said upper moveable wall 4 is returned into its starting position. This is followed by a first pressing stroke of the lateral moveable walls 2 and 3 along the arrows 10, and the pressing stroke of the lateral moveable walls 2 and 3 is transmitted via molding plates 8 to the mixture located in the molding chamber 1. Said molding plates 8 extend over the entire length of said mold chamber 1, and in the embodiment shown, they have a bent zone 9 which is intended to form a lateral upper bevel on the molding 15 to be formed. This is important, for example, when railroad ties are to be produced. Said molding plate 8 is profiled depending on the desired cross section of the moldings 15.

The representation in FIG. 1 corresponds to the position of said molding plates 9 after completion of the first pressing stroke along said arrows 10.

Figure 2:
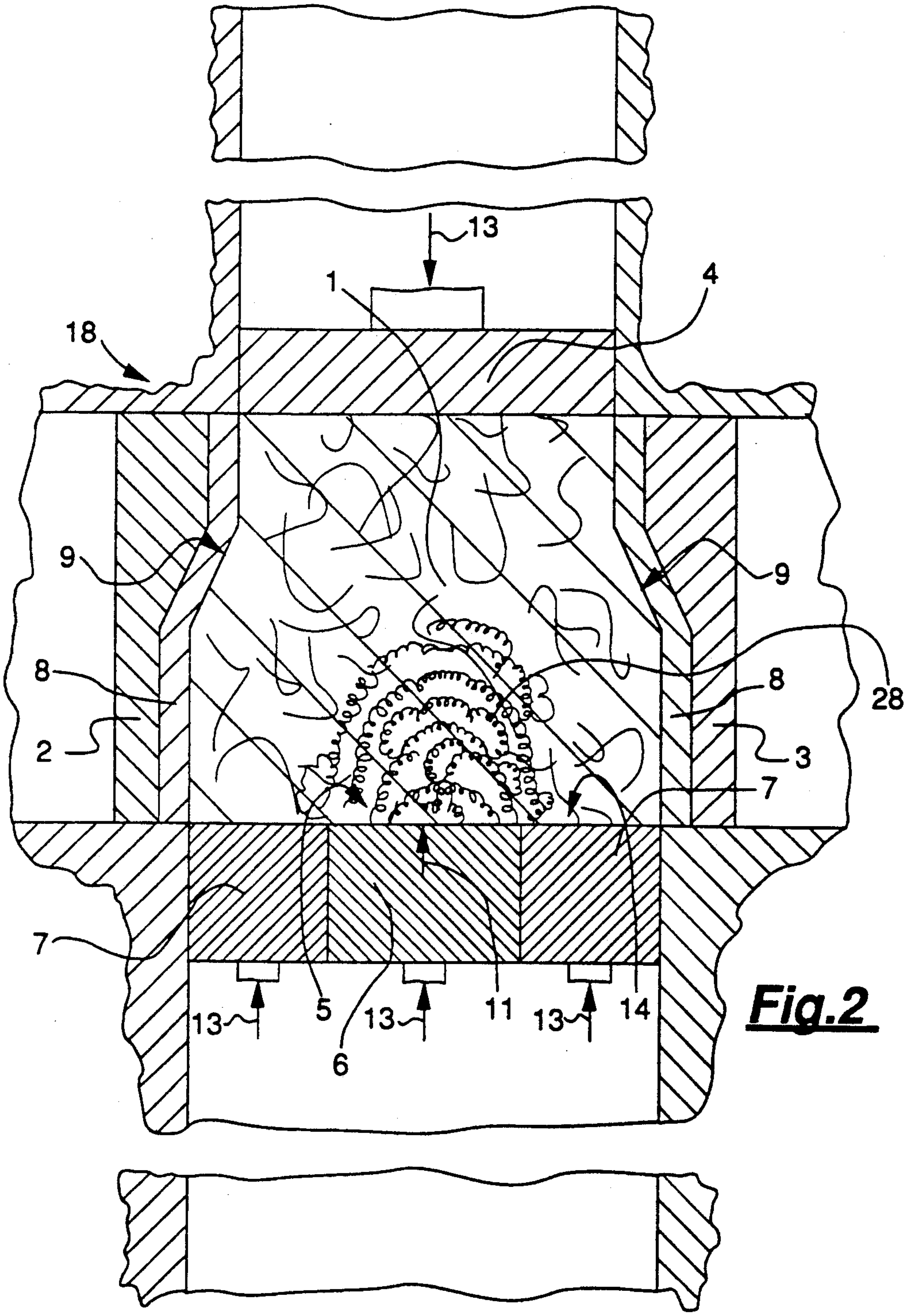
FIG. 2 is a cross section according to FIG. 2 with representation of a pre-compacted compression zone brought about by two-step vertical pressing.

This is followed by the steps according to FIG. 2, which are important for the present invention and are carried out in that the middle moveable wall, 6, performs a pre-pressing stroke along arrow 11, thus pushing the additional amount of fine plant parts located in said channel-shaped chamber 12 into the already filled mold chamber 1, as a result of which a compression zone 28 consisting of compacted fine parts is formed. In the embodiment according to FIG. 2. said compression zone 28 is located in the lower zone of said mold chamber 1. because it is assumed that the zone subject to tensile stress of the molding is to be formed there.

If the intended use of the molding to be formed would require a zone subject to tensile stress elsewhere, it would be advisable to displace said compression zone 28 according to the intended purpose. It is decisive that said compression zone 28 be located in the same core zone of said filling chamber 1 where the greatest stress of the molding can be expected to occur. The pressing position of the molding does not always correspond to the position in which it will be used. Therefore, FIG. 1 represents only one of many possibilities. For the same reason, it is also possible to provide a plurality of such compression zones by designing the moveable walls appropriately.

The essential purpose of the compression zone 28 formed is to create a strength in the core zone of the molding 15 to be formed, which exerts a reactive effect to the pressing force of the moveable walls 2 through 5. If the compression zone 28 had not been formed, the pressing force of said moveable walls 2 through 5 would not be sufficient to press the middle zone of the molding to be formed with the required intensity.

The pre-pressing stroke along said arrow 11 leads to the formation of a flush pressing surface 14 on the end face of said moveable wall parts 6 and 7. From now on, said moveable wall parts 6 and 7 are moved jointly as a single moveable wall.

However, it is also possible to move forward first the moveable wall series 6 and 7 and to close said channel-shaped chamber 12 by an additional movement of said moveable wall 6 only thereafter. The two movements may also be performed simultaneously.

The position of said moveable walls 6 and 7 after the pressing stroke performed along the arrows 13 is shown in the embodiment according to FIG. 2. Said lateral moveable walls 2 and 3 with their molding plates 8 have maintained their position under pressure, whereas said upper and lower cheek plates 4 and 5 have been moved against each other.

Figure 3:
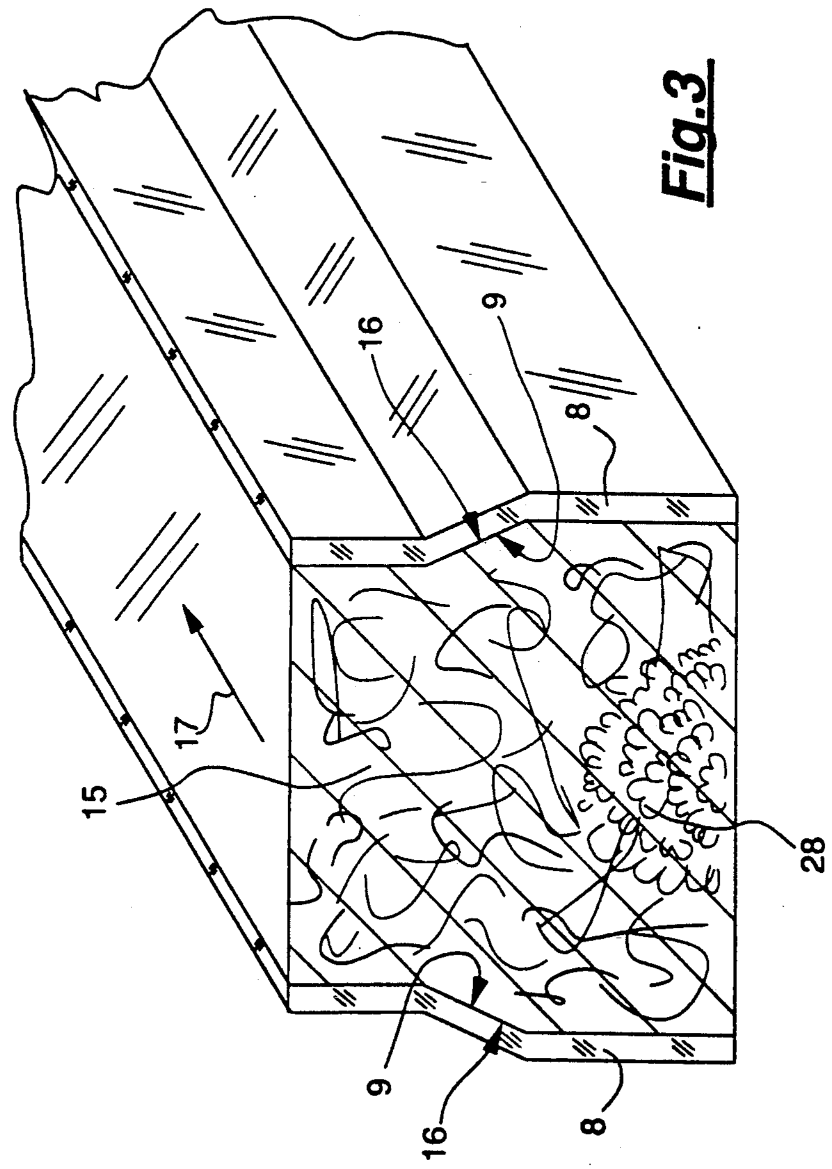
FIG. 3 is a schematic perspective partial view of a pre-pressed molding with lateral molding plates at the transition from one molding press into another.

These movements according to FIGS. 1 and 2 take place in a first molding press 18. The work in said first molding press 18 is completed with the pressing process according to FIG. 2. The pressed molding is subsequently pushed out of said first molding press 18 in the longitudinal direction along with said two molding plates 8, as is symbolically indicated by arrow 17 in FIG. 3. Said molding plates 8 now slide along said lateral moveable walls 2 and 3, which makes it necessary to ensure low-friction guiding. Corresponding suggestions can also be found in the state of the art mentioned in the introduction.

The embodiments according to FIGS. 4 through 7 show different press sections in a second molding press 19, into which the blank of the molding 15 has been pushed together with said molding plates 8 to form molding chamber 1'.

Figure 4:
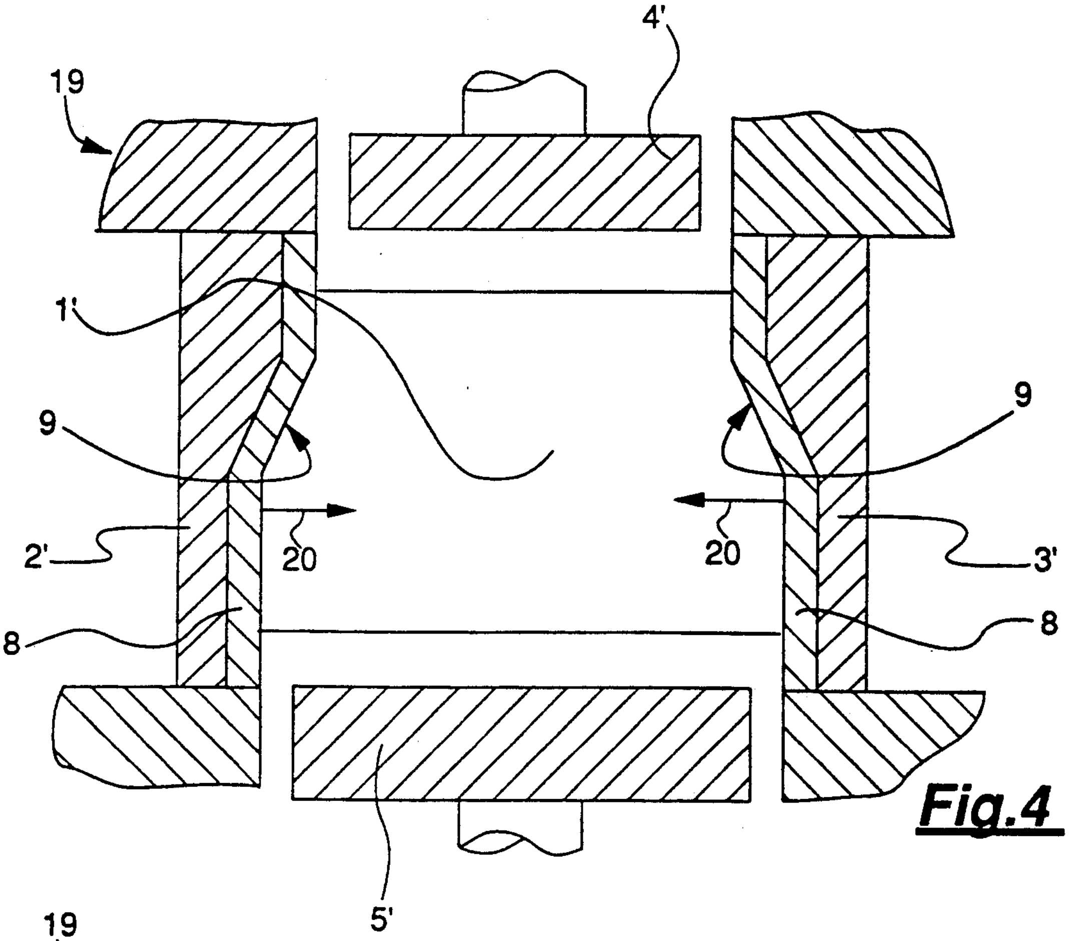
FIGS. 4 through 7 are cross sections through a similar the pressing device of a second stage of molding shown in different positions of the press.
Figure 5:
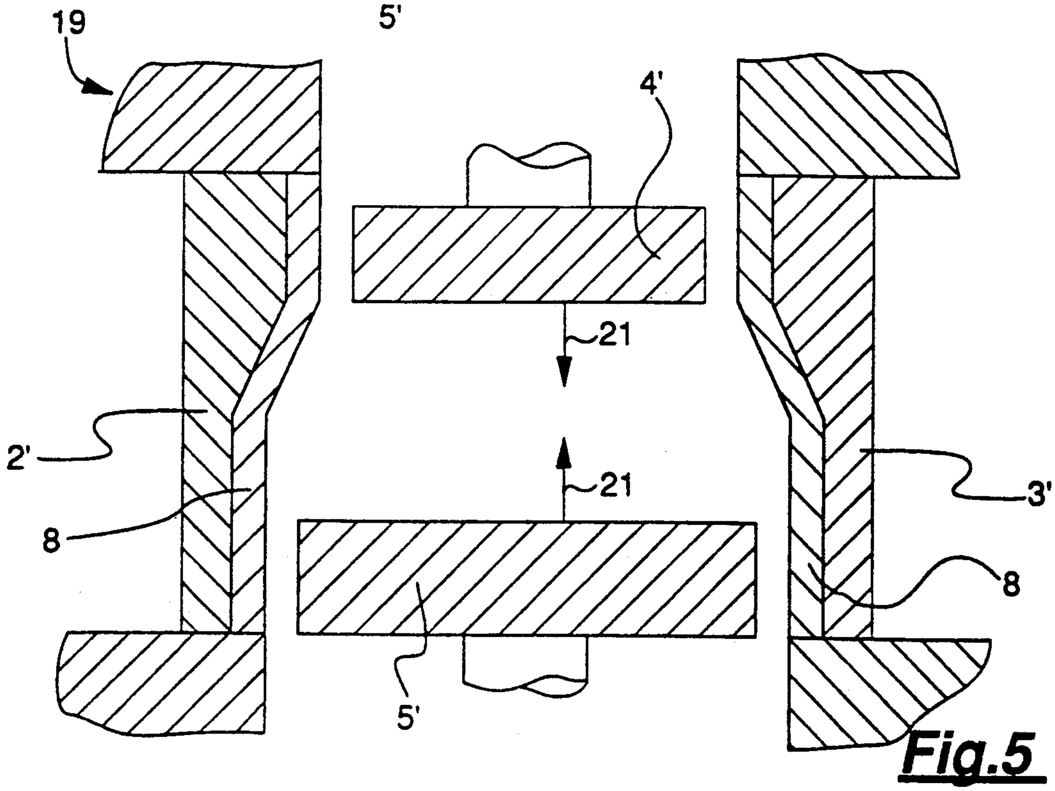

In said second molding press 19, the lateral side cheeks 2' and 3' with said molding plates 8 that are in contact with them are moved against each other in the direction of the arrows 20 during another pressing stroke. It should be ensured in this connection that said upper and lower molding plates 8 do not yet reach the plane of action of said upper and lower cheek plates 4' and 5'. This transverse pressing stroke according to FIG. 4 is followed by a vertical pressing stroke according to FIG. 5, after which said upper and lower moveable walls 4' and 5' are moved against each other along the arrows 21. Said moveable walls 4' and 5' thus almost reach their final pressing end positions.

Figure 6:
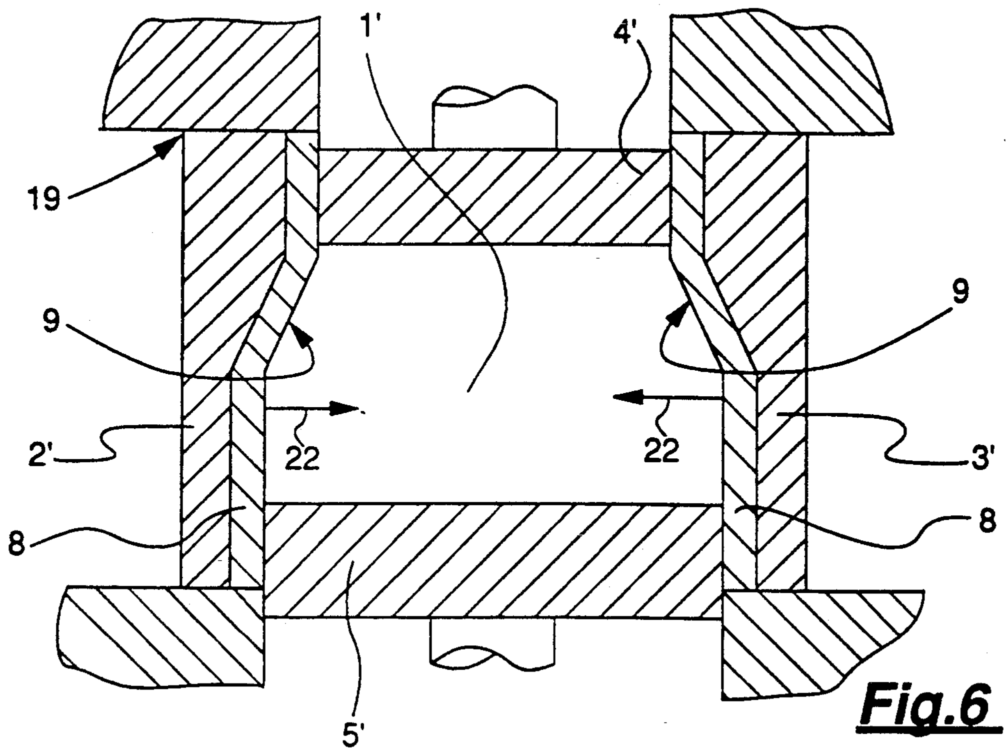

This process is followed by another transverse pressing stroke according to FIG. 6, during which said molding plates 8 are moved forward into their final pressing end positions. The gap between said molding plates 8 and said upper and lower moveable walls 4' and 5' is thus compensated. This transverse movement takes place along the arrows 22.

Figure 7:
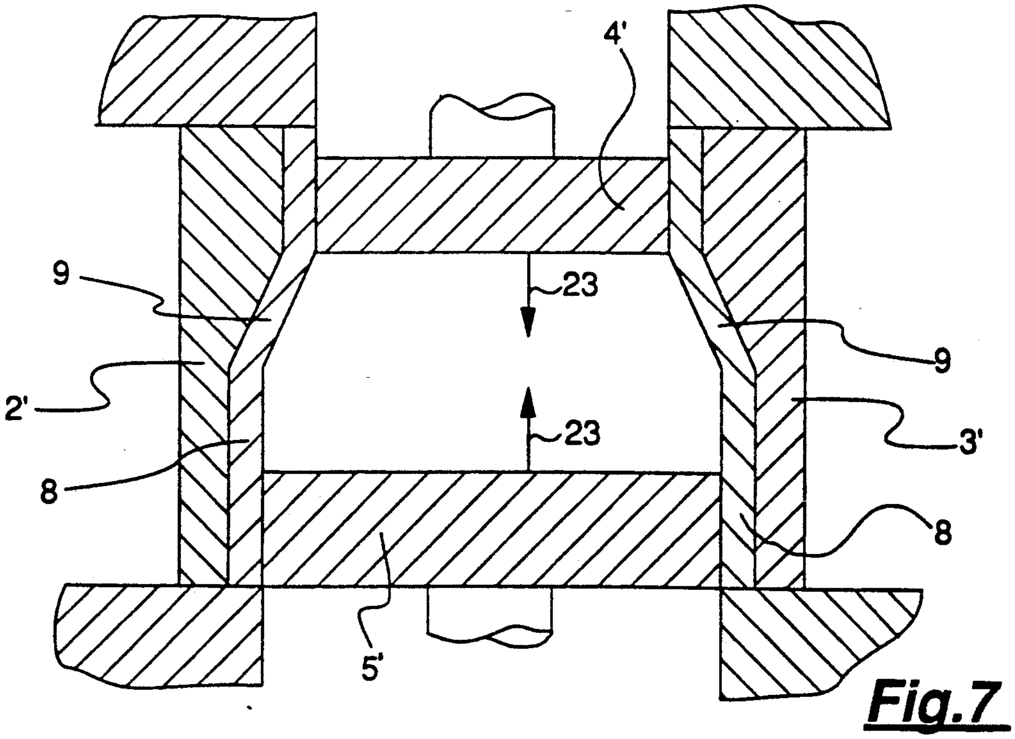
Figure 8:
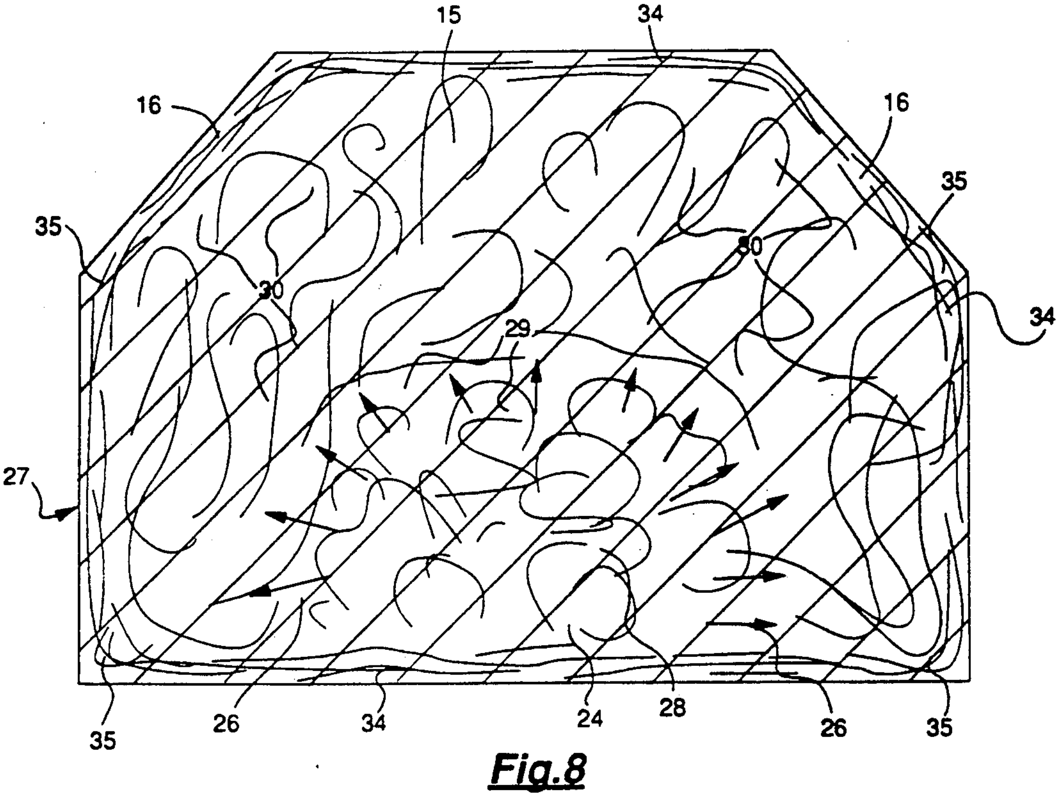
FIG. 8 shows a cross section through a furnished pressed molding.

FIG. 7 shows the absolute pressing end position, in which said upper and lower moveable walls 4' and 5' have been moved against each other along the arrows 23. It is seen that the pressing surface of said upper cheek plate 4' is now flush with the upper bend in the bent zone 9 of said molding plates 8, as a result of which a molding 15 according to FIG. 8, in which the bevel 16 is an imprint of said molding plates 8, has been formed. Said molding plates 8 have also formed the side walls 27 and bottom surface 25 of the molding 15 in the same way.

Said compression zone 28, shown symbolically, which generates forces of reaction according to the arrows 29 when a pressure acts on the outer surface of the molding 15 via the moveable walls 2 through 5 or 2' through 5', is represented in the middle section 24 of the molding 15. The fine parts being compacted now slide off on said compression zone 28, unless they remain directly in this zone in the compressed state, which leads to an arc-shaped deformed structure along the lines 30 in the molding 15. A particularly greatly compacted peripheral zone 34 is also formed on the molding 15 at the same time. The edge zones 35 are characterized by a particularly high degree of compaction. This explains why moldings 15 produced according to the present invention possess particularly great strength in the normally jeopardized edge zones.

Figure 9:
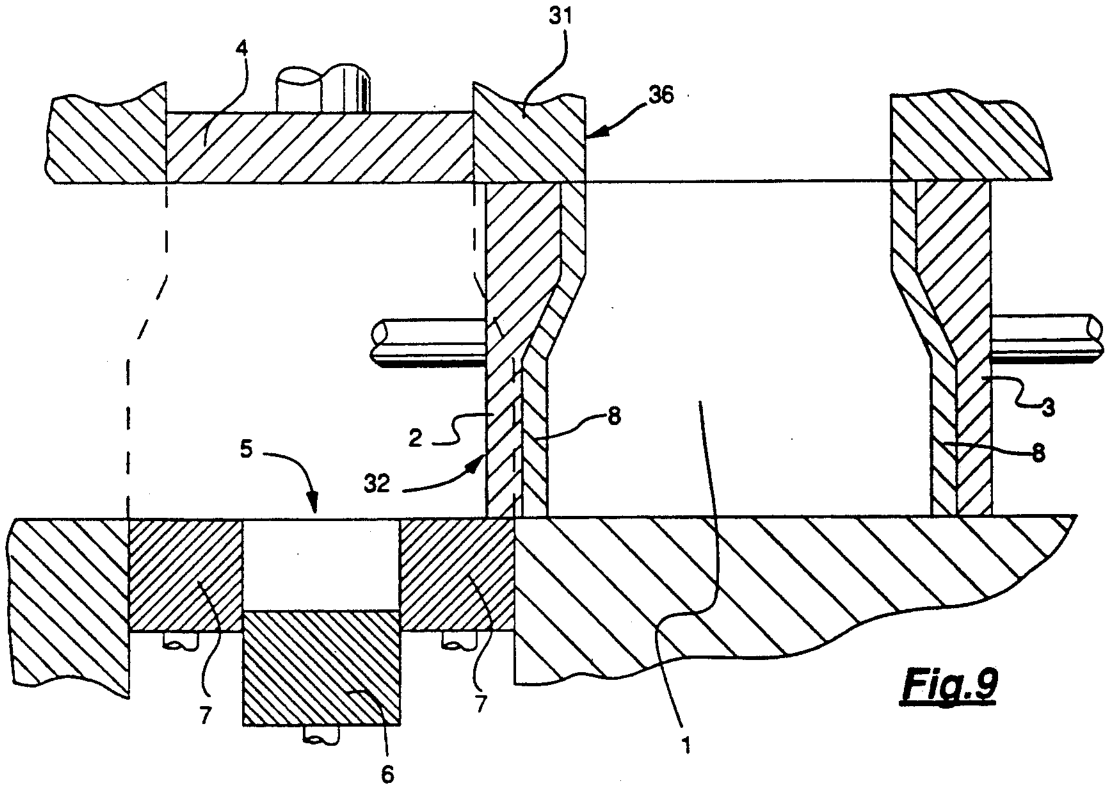
FIG. 9 is a sectional view of another embodiment of mold construction.

Finally, the embodiment according to FIG. 9 shows a machine arrangement as an alternative to FIG. 1, in which said mold chamber 1 is filled independently of the position of said upper moveable wall 4. To achieve this, the machine is subdivided so that said moveable wall 4 is arranged in one machine part 31 and the other moveable walls 2, 3, and 5 with said molding plates 8 in another machine part 32. If said machine parts 31 and 32 are displaced transversely relative to one another, said mold chamber 1 can be filled regardless of the position of said upper moveable wall 4.

In an alternative, said lower moveable wall 5 may also be left in the position shown in FIG. 1, so that only said lateral moveable walls 2 and 3 with said molding plates 8 are to be moved to below the filling opening 36. This movement can be performed by proper selection of the stroke of the drives for said lateral moveable walls 2 and 3.

What is claimed is:

1. A process of forming a molded product using a molding press having an enclosable chamber with at least two independently moveable walls, comprising the steps of: filing the chamber with compactible material; closing the chamber; moving said moveable walls inwardly a first amount to compress said compactible material adjacent said movable walls to a first density; and moving a pre-selected moveable wall a second amount compressing said compactible material adjacent said pre-selected moveable wall at a preselected zone into a second density, said second density being greater than said first density, said preselected zone being the volume subjected to the greatest tensile stress in the molded product.

2. A process in accordance with claim 1 further comprising:

forming a single side of the molded product with at least two moveable walls, with at least one moveable wall being said pre-selected wall.

3. A process in accordance with claim 2, wherein:

prior to said filling, said pre-selected wall is extended further outward from the mold expanding said molding chamber and forming an extended channel.

4. A process in accordance with claim 2, wherein:

said pre-selected wall is moved into the molding after said remaining moveable walls have finished moving.

5. A process in accordance with claim 3 wherein:

said extended channel is filled with additional material which is different from original said material to be pressed, in order to impart the section of the molding adjacent said pre-selected movable wall with different qualities.

6. A process in accordance with claim 1 wherein:

said pre-selected wall moves into a section of the molded product to form a compression zone of particularly precompacted fine parts, which has a reactive effect against the subsequent pressing of the moveable walls.

7. A process in accordance with claim 1 wherein:

after pressing of said pre-selected wall the mold is moved while still under pressure, from a first molding press into a second molding press.

8. A process in accordance with claim 1, further comprising: removing one of said moveable walls to allow said filling of said mold chamber.

9. A process in accordance with claim 1 wherein: said moveable walls include a pair of lateral walls and upper and lower walls at least one or at least one section of one of said upper or lower moveable walls being said pre-selected wall and producing said second density in a middle zone of the molding.

10. A process in accordance with claim 2, further comprising: moving two opposite walls transversely, relative to said single side in order to expose an opening for said filling of said chamber.

11. A process of forming a molded product using a molding press having an enclosable chamber with at least two independently moveable walls, comprising the steps of:

filling the chamber with compactible material; closing the chamber; moving said moveable walls inwardly in a manner causing at least one preselected moveable wall to press said material into a preselected section of the molding, to a greater degree than at least one other moveable wall forming a single side of the molded product with at least two moveable walls, with at least one moveable wall being said pre-selected wall, prior to said filling, said pre-selected wall is extended further outward from the mold expanding said molding chamber and forming an extended channel, filling said channel with additional said compactible material said pre-selected wall, after said filling of said chamber, is moved flush to an adjacent wall to then form a common moving wall; and moving said common wall inwardly to complete pressing of the molded product.

12. A process for pressing a flexurely rigid beam-shaped molding made from fine plant parts mixed with binders which beam is to be subjected to a top load causing the beam to bend comprising the steps of: positioning a plurality of moveable walls to form a premold cavity, said premold cavity being larger than the beam-shaped molding, and being arranged in a shape which is substantially similar to the shape of the beam-shaped molding; positioning a preselected moveable wall to provide said premold cavity with a recess distorting said substantially similar shape along a bottom edge of the premold cavity; filing said premold cavity with the fine plant parts mixed with binders; moving said moveable walls inward into the shape of the beam-shaped molding by moving said plurality of moveable walls a first distance and moving said preselected moveable wall a second distance which is greater than first said distance.

13. A process according to claim 12 wherein said step of moving said preselected moveable wall is carried out until said preselected moveable wall is flush with adjacent other of said moveable walls, and then all of said moveable walls are moved into the shape of said beam-shaped molding.

14. A process according to claim 13 wherein the mixture of the fine plant parts contains a certain percentage of long chips and are introduced to said premold cavity such the long chips are oriented parallel to the longitudinal direction of the beam-shaped molding.

15. A process according to claim 13 wherein said step of moving said moveable walls is carried out by moving the moveable walls alternatingly and repeatedly.

16. A process according to claim 13 further comprising the step of applying heat to said beam-shaped molding.

* * * * *